United States Patent [19]

Meuly

[11] 4,009,251

[45] Feb. 22, 1977

[54] PROCESS FOR THE REMOVAL OF HYDROGEN SULFIDE FROM GASEOUS STREAMS BY CATALYTIC OXIDATION OF HYDROGEN SULFIDE TO SULFUR WHILE INHIBITING THE FORMATION OF SULFUR OXIDES

[75] Inventor: Walter C. Meuly, Piscataway Township, Middlesex County, N.J.

[73] Assignee: Rhodia, Inc., New York, N.Y.

[22] Filed: Feb. 13, 1975

[21] Appl. No.: 549,576

Related U.S. Application Data

[63] Continuation-in-part of Ser. No. 391,922, Aug. 27, 1973, abandoned.

[52] U.S. Cl. .......................... 423/573 G; 423/226; 210/63 R; 260/608
[51] Int. Cl.$^2$ .................. B01D 53/34; C01B 17/04
[58] Field of Search .......... 423/571, 573, 224, 226, 423/210, 230, 227–228, 243; 260/608; 210/63

[56] References Cited

UNITED STATES PATENTS

| 3,097,926 | 7/1963 | Nicklin et al. | 423/573 L |
| 3,622,273 | 11/1971 | Roberts et al. | 423/226 |

OTHER PUBLICATIONS

Handbook of Chemistry & Physics, The Chemical Rubber Company, Cleveland, Ohio, 52nd Ed., 1971–1972, pp. D120 & D121.

*Primary Examiner*—Earl C. Thomas

[57] ABSTRACT

A process is provided for removing hydrogen sulfide and alkyl mercaptans from gaseous streams. The hydrogen sulfide is oxidized catalytically to sulfur, substantially without formation of sulfur oxides, in the presence of a metal chelate catalyst solution and a soluble alkali metal or alkaline earth metal or ammonium or amine salt of an acid having a pK within the range from about 1.2 to about 6. The alkyl mercaptans are oxidized to dialkyl disulfides under the same conditions.

19 Claims, No Drawings

PROCESS FOR THE REMOVAL OF HYDROGEN SULFIDE FROM GASEOUS STREAMS BY CATALYTIC OXIDATION OF HYDROGEN SULFIDE TO SULFUR WHILE INHIBITING THE FORMATION OF SULFUR OXIDES

This application is a continuation-in-part of Ser. No. 391,922, filed Aug. 27, 1973, and now abandoned.

Hydrogen sulfide and alkyl mercaptans are a major source of pollution of air streams, since they are liberated as waste by-products in a number of chemical processes, such as sulfate or Kraft paper pulp manufacture, viscose manufacture, sewage treatment, sulfuretting fatty oils, and producing organic sulfur compounds, as well as petroleum refining and in the production of natural gas and of combustible gases from coal, such as in the coking operation. It has often been customary simply to vent the waste gases to the atmosphere, but with the present emphasis on avoiding pollution of the environment, it is no longer possible to dispose of these waste materials in this way. Methods used to abate the hydrogen sulfide pollution include absorption in caustic solutions, chlorination, adsorption by basic materials such as organic amines, precipitation with heavy metal salts, such as iron carbonates. All these methods have serious defects, for example, caustic treatment is prohibitively expensive because stoichiometric amounts are required and the resultant sodium sulfide solution is a pollutant that is difficult to dispose of. Absorption does not render hydrogen sulfide harmless but only produces it in more concentrated form.

The process is also applicable to the conversion of $H_2S$ to sulfur in any system where $H_2S$ is to be recovered as sulfur, whether or not the hydrogen sulfide is regarded as a waste stream, in lieu of other $H_2S$-conversion processes, such as in a Claus operation.

In most waste streams, the concentration of hydrogen sulfide is relatively low, of the order of a few parts per million to a few percent. Due to the very high odor intensity of hydrogen sulfide, which makes it readily perceptible to the human nose at a concentration of 0.01 part per million, the abatement of hydrogen sulfide requires a very efficient removal process. The same is true of alkyl mercaptans.

Engelhardt U.S. Pat. No. 1,479,852 dated Jan. 8, 1924 describes a method of catalyzing the oxidation of hydrogen sulfide to free sulfur using a heterogeneous solid-vapor catalysis mechanism, passing the gas containing hydrogen sulfide through a bed of active carbon which serves as an extended-surface catalyst. Engelhardt further discloses that the process is improved by the addition of ammonia or amines. However, the process is accompanied by the evolution of heat, so that molten sulfur is produced which clogs the reaction chamber, and the fused sulfur is extremely difficult to remove from the bed, when catalyst regeneration becomes necessary.

Herold et al. U.S. Pat. No. 1,984,971 dated Dec. 18, 1934 proposes to improve this treatment by passing the gas through extended surface solid-catalyst beds in a plurality of stages, with cooling between the stages. This keeps the temperature in the beds below the fusion temperature of the deposited sulfur, but, since this requires operation at a lower temperature, larger catalyst beds are necessary, and this, in turn, increases the regeneration problem. At the same time, there is a considerable pressure drop in forcing the gas through a plurality of beds. When the large quantities of stack gas that have to be treated and the small quantities of hydrogen sulfide in such gases are considered, it is apparent that the size and expense of the catalyst-treating plant are very large.

Gislon and Quiquerez U.S. Pat. No. 2,659,691 dated Nov. 17, 1953 describes the conversion of mercaptans in petroleum products into disulfides by oxidation. The patent discloses that certain organic substances, especially organometallic compounds with chelated bonds, have the property of absorbing oxygen from air and of releasing it under certain conditions. The metal chelates that are disclosed include iron-indigo complexes, disalicylal ethylene diamino cobalt, and bidisalicylal ethylene diamine-aquo cobalt.

The patent indicates that these compounds behave as oxidation catalysts, and in the presence of a solvent for the chelate, the absorption and exchange of oxygen with the mercaptans to form the sulfide proceed simultaneously. Further, the same effect is obtained in the presence of water, and it is advantageous to use a solution or dispersion of the chelate in the solvent. The patent discloses a catalyst system which could not be used in aqueous solution, since the chelate is insoluble in water. The patent does not indicate, moreover, that the chelate would be effective to oxidize hydrogen sulfide to sulfur.

Dunn U.S. Pat. No. 3,071,433 proposes to substitute a process in which what Dunn refers to as the catalyst was present in the liquid phase, rather than as a solid. The catalyst used was selected from the class consisting of ammonia, aliphatic amines and alicyclic amines. The liquid catalyst, a solvent solution of the amine or ammonia, is simply sprayed into stack gases while confined in the stack of the mill or plant. The catalyst does its work in admixture with the gases, and is carried off therewith, to complete its catalytic function in the open air. The sulfur is removed as well, settles out over the surrounding countryside, and is washed away from time to time, by rainfall.

The Dunn process accordingly substitutes particulate sulfur pollution for hydrogen sulfide pollution, and in addition leads to a steady consumption of catalyst. Besides that, the hydrogen sulfide may be dissipated before it is oxidized to sulfur in dilution of the stack gases containing the catalyst, when they encounter the outside atmosphere upon emergence from the stack.

Hartley, Craig and Sapiro U.S. Pat. No. 3,068,065 dated Dec. 11, 1962 suggest an entirely different approach. Hartley et al point out that it is known that hydrogen sulfide can be removed from waste gases using an alkaline, iron-containing liquor, consisting essentially of a suspension of iron oxide, hydrated iron oxide, or basic iron carbonate, in a solution of sodium or ammonium carbonate or bicarbonate. The hydrogen sulfide reacts first with the alkali to form alkali sulfide, and this in turn reacts with the iron in suspension to form iron sulfide. The reaction is not instantaneous, and it does not completely remove hydrogen sulfide from the gas. The fouled liquor has to be aerated to oxidize the iron, liberate sulfur, and regenerate it for reuse. Besides that, the iron is present as a suspension of solid material, and as a result there is a continuing loss of reagent associated with the removal of the sulfur liberated from the system.

This difficulty Hartley et al overcome by using the iron in chelated form, in aqueous solution. Hartley et al found that solutions of iron complexed with chelating agents are reduced to the ferrous condition by hydrogen sulfide, and are readily reoxidized in a separate step to the ferric condition by aeration. Consequently, Hartley et al passed the gas bearing the hydrogen sulfide impurity through a conventional gas-washing tower, the gas flowing upwards countercurrently to the descending aqueous solution of chelated ferric iron, which is sprayed into the top of the tower, and descends against the gas flow. In a separate step, the liquor from the tower is then aerated by introduction of air, or by pumping the liquor through air injectors, to regenerate to ferric iron the iron which is converted to ferrous iron in the course of the reaction, and the sulfur is removed from the aerated liquor by known means.

Pitts, Jr. et al U.S. Pat. No. 3,097,925 dated July 16, 1963 propose to convert hydrogen sulfide to elemental sulfur by an oxidation-reduction system comprising a polyvalent metallic ion chelate complex solution wherein hydrogen sulfide is oxidized to sulfur and the reduced metallic cation is oxidized to its original valence state by a free-oxygen containing gas in a second step. These reactions can be performed concurrently in the same solution.

Alkyl mercaptans are oxidized to dialkyl disulfides:

$$4RSH + O_2 \rightarrow 2RSSR + 2H_2O.$$

Meuly and Seldner U.S. Pat. No. 3,226,320 dated Dec. 28, 1965 tackled the problem in a slightly different way. Meuly et al suggested spraying into the stack gas a solution of a chelate of a polyvalent metal with ethylene diamine tetraacetic acid, N-hydroxyethyl ethylene diamine triacetic acid, and other chelating agents. Among the polyvalent metal chelates that can be used are ferric chelates. The liquid catalyst is sprayed into the vent system as a mist, and reacts with the pollutant sulfur compounds in the gases. The reaction continues in the atmosphere, if the catalyst is entrained in the gas. Air can be introduced into the reaction system at the same time. The oxygen in the air or in the atmosphere beyond the stack serves to oxidize the hydrogen sulfide or mercaptan. This reaction is not fully efficient either, and the concentration of hydrogen sulfide reported is reduced from 1,400 ppm to 300 ppm, in the case described in Example 24 of the patent. Besides that, there is a considerable loss of catalyst to the atmosphere, and the result as in Dunn is that particulate sulfur is the pollutant in place of hydrogen sulfide.

As noted by Pitts, Jr. the catalytic oxidation of hydrogen sulfide to elemental sulfur in the presence of a polyvalent metal chelate catalyst solution proceeds in accordance with the following overall reaction:

$$2H_2S + O_2 = 2S + 2H_2O$$

This is a redox type reaction. If the polyvalent metal is ferric iron the ferric iron is reduced to ferrous iron by the oxidation of hydrogen sulfide to sulfur. In contact with oxygen, the ferrous iron is reoxidized to the ferric state, in accordance with the following ionic equations:

$$2 Fe^{+++} + H_2S = 2 Fe^{++} + 2 H^+ + S$$

$$2 Fe^{++} + 2 H^+ + \frac{1}{2} O_2 = 2 Fe^{+++} + H_2O.$$

These reactions can be carried out simultaneously or in sequence. If they are carried out simultaneously, both the hydrogen sulfide-containing stream and the oxygen-containing stream are blended, or mixed prior to contacting with a polyvalent metal chelate solution. If the stream containing the hydrogen sulfide also contains oxygen, the two reactions occur concurrently.

If the reactions are to be carried sequentially, the hydrogen sulfide-containing stream is first contacted with the polyvalent metal chelate solution, and then the resulting solution is contacted with the oxygen-containing stream. In the first stage, the hydrogen sulfide is removed stoichiometrically from the stream, and in the second stage the ferrous iron in the chelate solution is then oxidized by oxygen back to ferric iron, and the solution recycled.

In the two-stage operation, one mode of operation is to continuously circulate the catalyst solution between two reactors, one in which the catalyst solution is brought into contact with the hydrogen-sulfide and/or alkyl mercaptan-containing stream and reduced, and one in which the catalyst solution is brought into contact with oxygen or an oxidizing agent and oxidized. It is also possible to carry out the regeneration stepwise or batchwise, removing catalyst solution batchwise to be oxidized, and returning oxidized catalyst into contact with the hydrogen sulfide-and/or alkyl mercaptan-containing stream. The reactor can be any device that provides efficient contact between gas and liquid phases, such as agitated vessels, turbulent flow pipes, packed towers, Venturi scrubbers, etc.

In batchwise operation the catalyst solution is removed from the reactor when it is in the reduced form and is then regenerated separately by reoxidation with oxygen for subsequent use.

The system of reducing the catalyst in one location and regenerating it in another is advantageous if oxygen or nitrogen cannot be tolerated with the hydrogen sulfide- and/or alkyl mercaptan-containing gas stream. The catalyst can be regenerated without any contamination of the latter stream with the oxidizing stream.

It is usually important that these reactions take place as rapidly as possible. Under appropriate conditions, the reactions can be virtually instantaneous, so that a small amount of polyvalent metal chelate solution catalyst is capable of oxidizing large amounts of hydrogen sulfide per unit time.

It is known that polyvalent metal chelate solutions are capable of solubilizing the metal ion at hydrogen ion concentrations well above pH 7, under conditions where without the chelating agent the metal would be precipitated, and become inactive as a catalyst. It is also recognized that the speed of redox reactions decreases with decreasing pH. Hence, the metal chelate permits the carrying out of the oxidation reaction at a relatively high pH, at which the reaction proceeds rapidly. However, the prior art has generally considered that any pH within a relatively wide range can be used equally well in this process. Hartley et al U.S. Pat. No. 3,068,065 for example indicate that the iron chelate solution may be alkaline or acidic, as desired. Pitts, Jr. et al U.S. Pat. No. 3,097,925 indicate that the pH can be within the range from 1 to 13, with the preferred range above 7 to 10. Meuly et al U.S. Pat. No. 3,226,320 suggest that operation within a pH range of from 4 to 11 is feasible. Roberts et al U.S. Pat. No. 3,622,273 stipulate a pH within the range from 5 to 6.5, using a buffer. However, Roberts et al recognize that in order to maintain the pH within this range during the reaction continuous addition of sodium carbonate is necessary, because the pH tends to drop as the reaction proceeds. Roberts et al do not indicate why this is so.

It has been determined in accordance with the invention, that the pH of any chelate solution tends to drop as the reaction proceeds because of previously unreported side reactions leading to the formation of acidic reaction products in addition to sulfur during the oxidation of hydrogen sulfide. These products have been identified as oxides of sulfur $SO_x$, x representing 2 and 3, or $S_2O_2$, that in the presence of alkali appear in the chelate solution as sulfites, sulfates and thiosulfates.

It has also been determined, in accordance with the invention, that the speed of the catalytic oxidation reaction depends to a considerable extent on the hydrogen ion concentration of the reaction medium. At a pH in excess of 7, the oxidation of hydrogen sulfide is virtually instantaneous, and the regeneration of ferrous to ferric ion is equally rapid, provided oxygen is made available at the interface with the aqueous phase by suitable gas dispersion. Complete removal of hydrogen sulfide is achieved under these conditions at residence times of fractions of a second. As the pH of the system decreases below 7, the speed of the reaction decreases significantly. Thus, under a given set of conditions, at a pH above 7, the hydrogen sulfide removal may be complete, but at a pH below 7 (say, at a pH of 4) the hydrogen sulfide removal may drop to less than 50%. Clearly, if possible, it is desirable to carry out the reaction at a pH above 7, in order to take advantage of the greater reaction speed at this pH.

However, it has further been determined, in accordance with the invention, that at a pH in excess of 7, the amount of sulfur oxides formed as by-product increases significantly, which is highly undesirable, because these acidic by-products require the continuous addition of alklai in order to maintain a pH within a selected range, particularly at about 7 to 11. When this is done in a continuous process, the concentrations of salts in the chelate catalyst solution become rather high, due to the accumulation of the neutralization products in the solution, and may require periodic renewal of the chelate solution, which is expensive. Moreover the production of the acidic by-products necessarily reduces the yield of sulfur. At a pH above 7, the sulfur oxides formed may be from about 2 to about 9% of the hydrogen sulfide oxidized, regardless of the type of alkali used to maintain the pH.

Thus, these side reactions pose a considerable dilemma. If the process be conducted at a pH above 7, hydrogen sulfide removal may be complete but its conversion to sulfur will be incomplete and accompanied by the production of sulfur oxides in side reactions, reducing the yield of sulfur, and requiring the continuous addition of alkali, both of which increase the cost of operation. If the process be conducted at a pH below 7, the formation of sulfur oxides may be rather low, but the hydrogen sulfide removal will be far from quantitative, because the reaction proceeds much more slowly.

In accordance with the invention, it has now been determined that if the oxidation of hydrogen sulfide to sulfur be carried out in the presence of polyvalent metal chelate solution containing an alkali metal, alkaline earth metal, ammonium or amine salt of a nonoxidizing acid having a pK within the range from about 1.2 to about 6, the formation of acidic sulfur oxides is substantially inhibited, and may be entirely prevented, while the reaction of hydrogen sulfide to form sulfur proceeds at a very high rate, and is practically instantaneous under appropriate conditions. These salts apparently act as catalyst poisons or oxidation inhibitors, to inhibit the oxidation of hydrogen sulfide beyond sulfur to sulfur oxides, while at the same time, surprisingly, they markedly increase the efficiency of hydrogen sulfide removal. These inhibitors may be regarded as catalyst poisons or oxidation inhibitors which diminish the oxidizing capacity of ferric iron, so that the oxidation of hydrogen sulfide is arrested at the stage of elemental sulfur.

The pK value of an acid is defined as:

$$pK = -\log K = \log(1/K)$$

where $K$ is the dissociation constant. See pp 80–83, Tables 510, 511 of Therald Moller, Qualitative Analysis, (1958) McGraw Hill, New York.

This is a measure of the strength of the acid, and is applicable both to inorganic and to organic acids. The following tabulation shows the pK values for a number of nonoxidizing organic and inorganic acids, which can be employed in the form of their alkali metal, alkaline earth metal, ammonium or amine salts, in accordance with the invention (for polyprotic acids, the pK value for the first ionization is controlling, and must be within the range stated):

|  |  | pK |  |  | pK |
| --- | --- | --- | --- | --- | --- |
| Formic acid | : | 3.75 | Acetic acid | : | 4.75 |
| Citric acid | : | 3.14 | Tartaric acid | : | 3.0 |
| Propionic acid | : | 4.87 | Salicylic acid | : | 2.4 |
| Malic acid | : | 3.40 | Lactic acid | : | 3.08 |
| Oxalic acid | : | 1.40 | Benzoic acid | : | 4.20 |
| Phthalic acid | : | 2.90 | Thiosulfuric | : | 1.7 |
|  |  |  | Nitrous | : | 3.4 |

Strong inorganic acids such as sulfuric acid accordingly have a negative pK value, and are excluded as also is carbonic acid, as well as oxidizing acids such as chromic acid and permanganic acid.

As the alkali metal salts, sodium, potassium, lithium and ruthenium are exemplary. As the alkaline earth metal salts, calcium, barium, strontium and magnesium are exemplary. Also useful are ammonium salts, and organic amine salts, such as for example, methylamine, ethylamine, propylamine, butylamine, isobutylamine, teritary-butylamine, secondary-butylamine, dimethylamine, diethylamine, trimethylamine, triethylamine, tripropylamine, tributylamine, triisobutylamine, monosecondarybutyl-diisopropylamine, monoethyl dipropylamine, and monethyl dibutylamine, monoethanolamine, diethanolamine, triethanolamine, monopropanolamine, pyridine, morpholine, cyclopentylamine, piperidine, and cyclohexylamine. The acid salt should of course be water soluble or soluble at least in the polyvalent metal chelate solution.

The polyvalent metal chelate catalyst solutions employed in the process of the invention are coordination complexes in which polyvalent metals form chelates with amino acids having one of the following general formulae:

$$(A)_{3-n} - N - (X)_n, \qquad I$$

wherein
 n is a number from 1 to 3;
 X is selected from the class consisting of acetic and propionic acid groups;

A is 2-hydroxy ethyl, 2-hydroxy propyl, or an alkyl group having from one to about four carbon atoms.

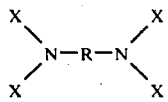
II.

wherein:
- from two to four of the groups X are selected from the class consisting of acetic and propionic acid groups;
- from zero to two of the groups X are selected from the class consisting of 2-hydroxy ethyl, 2-hydroxy propyl, and

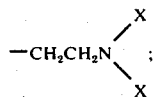

- R is ethylene, propylene or isopropylene or alternatively cyclohexane or benzene where the two hydrogen atoms replaced by nitrogen are in the 1,2-position.

As the polyvalent metal, any polyvalent metal that exists in more than one oxidation stage can be used, but iron, copper and manganese are preferred, especially iron. The polyvalent metal should be capable of oxidizing hydrogen sulfide, while being reduced itself from a higher to a lower valence state, and should then be oxidizable by oxygen from the lower valence state, and should then be oxidizable by oxygen from the lower to the higher valence state, in a typical redox reaction. Other polyvalent metals which can be used include lead, mercury, palladium, platinum, tungsten, nickel, chromium, cobalt, vanadium, titanium, tantalum, zirconium, molybdenum, and tin.

The polyvalent metal chelates are readily formed in aqueous solution by reaction of an appropriate salt, oxide or hydroxide of the polyvalent metal and chelating agent in the acid form or an alkali metal or ammonium salt thereof. Exemplary chelating agents include: amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950.

The concentration of metal ion in the catalyst solution is not critical. An effective catalytic action is obtained with amounts of metal as low as 0.01% by weight of the solution. Amounts as high as 10% metal ion can be used, with excellent results. Thus, concentrations of metal ion in the catalyst solution within the range from about 0.01 to about 10%, preferably from about 0.05 to about 5%, are effective.

The oxygen can be pure oxygen, or it may be in the form of air or other inert gas stream containing oxygen, such as $CO_2$—$O_2$ blends. Air is least costly as the oxygen source, and is preferred, but if the gas stream should not be diluted, pure or relatively pure oxygen can be used.

A quantitative reaction is obtained at room temperature, so that there is no need to employ higher temperatures. However, higher temperatures can be used, if desired or necessary. For instance, hot gases can be treated provided that care is taken to compensate for the water lost by evaporation. The metal chelate solution is stable well above 100° C., and thus the reaction can be carried out at elevated temperatures, well in excess of 100° C.

The pH of the system should be within the range from about 3 to about 11. The most efficient range for a given set of conditions is from about 7 to about 11, preferably from about 8 to about 10. If the chelate solution is acidic, it is necessary to adjust the pH of the solution to within this range by addition of an alkali, such as an alkali metal hydroxide, for example, sodium hydroxide, potassium hydroxide, lithium hydroxide, ammonia, an alkali metal carbonate or bicarbonate, an alkaline earth metal hydroxide such as calcium hydroxide, or an amine. As the organic amine, any of those mentioned above can be used.

The stoichiometric amount of oxygen to oxidize hydrogen sulfide to elemental sulfur in the reaction of the invention is about one-half part by volume per part of the hydrogen sulfide and one-fourth part by volume per part of the alkyl mercaptan. If the oxygen is available in the form of air, the theoretical requirement in the case of hydrogen sulfide is about five times greater, or more, or 2.5 parts of air by volume per part of hydrogen sulfide, and 0.62 part by volume per part of alkyl mercaptan. If the stream of air contains less than the explosive limit of 4.3% hydrogen sulfide, the available oxygen is at least tenfold theoretical. Air containing up to 25% $H_2S$ contains sufficient oxygen to oxidize the $H_2S$ to S.

Any gas-liquid contact system which ensures good contact between the phases can be used. In either a continuous or intermittent flow system, concurrent, countercurrent, and cross-flow flows can be used. Gas scrubbers can be used, such as spray scrubbers or towers, perforated plate towers, wetted wall columns, bubble-cap plate towers, sieve plate towers, packed towers, turbo-gas mixers, orifice-column mixers, injectors, jet mixers, turbo-gas absorbers, cascade towers, and bubble columns.

The reaction is applicable to any gaseous stream containing hydrogen sulfide and/or alkyl mercaptans in any concentrations, even in very low concentrations, of the order of a few parts per million. The reaction proceeds in the presence of $CO_2$, which is a considerable advantage, since many streams containing hydrogen sulfide and/or alkyl mercaptans also contain $CO_2$. Streams which can be freed from hydrogen sulfide and alkyl mercaptans by the processes of the invention include sour gases and waste gases from petroleum refining, stack gas from cellulose pulping processes, gaseous effluents from sewage disposal plants, tail gases from Claus process units, and hydrogen sulfide and alkyl mercaptan-containing waste gases from other chemical and industrial processes.

The following Examples illustrate preparation of an aqueous iron chelate catalyst solution. All parts are by weight. In use, the solution can be diluted with water. The solution can also be prepared at a higher concentration.

EXAMPLE A 12 parts ferric chloride anhydrous was dissolved in 918 parts water. This solution was added gradually under agitation to 70 parts of a commercial solution containing 41% of trisodium N-hydroxy ethyl ethylene diamine triacetic acid (HEDTA). A clear orange-brown solution was obtained which contained 0.4% chelated iron and had a pH of 6.2.

EXAMPLE B 9.3 parts technical ferric sulfate analyzing 21.8% iron was dissolved in 953 parts water. The solution was added under agitation to 37.3 parts of a 41% solution of trisodium N-hydroxy ethyl ethylene diamine triacetic acid (HEDTA). The clear solution contained 0.2% chelated iron and had a pH of 5.9.

EXAMPLE C

By using in Example B 43.3 parts of a 41% solution of the tetra sodium salt of ethylene diamine tetraacetic acid (EDTA) in place of HEDTA, a solution containing 0.2% chelated iron was obtained with a pH of 6.5 – 6.8.

EXAMPLE D

By substituting in Example B 29 parts of a 39% solution of the tri-sodium salt of nitrilo triacetic acid (NTA) in place of HEDTA, and adjusting the water to 962 parts, a solution containing 0.2% chelated iron with a pH of 4.0 – 4.5 was obtained.

EXAMPLE E

By using in Example B 20.1 parts of Versene Fe-3 Specific, (41% solution N,N-dihydroxyethyl glycine, Na- salt) in place of HEDTA, and adjusting the water to 970 parts, a solution containing 0.2% chelated iron was obtained, pH 4.0.

EXAMPLE F

By substituting in Example B 56 parts of Versenex 80, 40% solution (Na-diethylene triamine pentaacetate) for HEDTA, and adjusting the water to 935 parts, a solution containing 0.2% chelated iron was obtained, pH 8.5.

EXAMPLE G

By substituting in Example B the HEDTA with 9.9 parts of 2-hydroxy ethyl-imino-diacetic acid disodium salt, and adjusting the water to 980 parts, a solution containing 0.2% chelated iron was obtained pH 3.0.

EXAMPLE H

By using in Example B 16.5 parts trans-1.2-diaminocyclohexane tetraacetic acid monohydrate, neutralized with 18 parts sodium hydroxide 10%, in place of HEDTA, and adjusting with water to 1,000 parts, a solution containing 0.2% chelated iron was obtained, pH 3.6.

In all of these examples the ratio of chelating agent to iron ion is about 1.2 to 1.0 on a molar basis. The ratio may be decreased below 1.0 or increased above 1.2. If the solution is acidic, prior to use in alkaline medium, the pH of the solution is adjusted with alkali to pH 7.0 – 7.1 and is then made alkaline with a measured excess of alkali, to the desired pH, say, 8.0 to 9.0, using for instance, NaOH, KOH, Ca(OH)$_2$, Na$_2$CO$_3$, K$_2$CO$_3$, NH$_3$, MEA, DEA, TEA (mono-, di- and triethanolamine), or an alkyl amine, such as butyl amine or triethyl amine.

The following Examples represent preferred embodiments of the invention:

EXAMPLES 1 to 12

A number of inhibited catalyst solutions were prepared by adding to the catalyst solutions of Example B the inhibitors noted in Table I. The amounts of inhibitor are expressed as Fe equivalents, and range from 1 to 14 equivalents, calculated in the following manner: The catalyst solution Example B contained 0.2% Fe, and was therefore 0.036 Normal with respect to Fe. One equivalent of inhibitor is represented by the catalyst solution containing 0.036 N inhibitor. For Na-formate the catalyst solution should contain 0.036 moles Na-formate MW 68 or 2.45 parts per 1,000 parts. Thus, in order to add 2, 7 or 14 Fe equivalents of Na-formate inhibitor, 4.9, 17.2 or 34.3 parts Na-formate are added to solution Example B.

These catalyst solutions were then used for the removal of H$_2$S from an air stream, in equipment which afforded very efficient contact of the gas and liquid phases. 20 ml of the test chelate solution was diluted to 50 ml with water, and placed in a cylindrical vessel provided with a gas inlet tube and a gas outlet tube. The inlet tube connected to a fritted glass gas dispersion cylinder (20 mm high and 12 mm wide) located below the surface of the catalyst solution. A magnetic stirrer below the dispersion cylinder augmented the contact of gas and liquid phase. The depth of the liquid was about 50 mm, and the fritted cylinder was about 20 mm below the surface. The average path of the gas in the liquid was from 30 to 40 mm, and the residence time was one-fifth to one-third second.

The gas stream was prepared by mixing a measured stream of 3.2% H$_2$S by volume diluted with nitrogen with a measured stream of air prior to introduction into the catalyst solution. Concentration of H$_2$S varied from 100 ppm to 25,000 ppm, and was most commonly 10,000 ppm, measured both by rotameter and H$_2$S detection tube.

The flow of air was 300 ml/min., and the H$_2$S-N$_2$ flow 135 ml/min. resulting in a flow of 435 ml/min., containing about 10,000 ppm H$_2$S by volume. The amount of oxygen available was 27 times theoretical. It was established that increasing the H$_2$S concentration to 25,000 ppm and decreasing the oxygen to 300% theoretical did not affect the removal of H$_2$S materially. The exit gas was measured for H$_2$S content. The relative amounts of Fe-chelate and H$_2$S to be removed were such that the Fe-chelate present had to undergo an oxidation-reduction cycle every two minutes. This is a severe test condition, which the prior art does not appear to have employed. It permits for instance the study of the relative efficiency of various related chelates, as well as the conducting of experiments over a large number of oxidation-reduction cycles resulting in greater accuracy of results, especially with respect to minor side reactions, such as SO$_x$ formation.

When operating at a pH above 7.1, the pH of the chelate solution was brought to 7.1, whether it contained an inhibitor or not. This required, in the case of HEDTA, about 0.40 millimol NaOH. The inhibitor did affect the amount NaOH required. Other Fe-chelates required different amounts of NaOH; the alkaline chelate of Example F required HCl.

In order to operate at pH 8 to 10.5, additional alkali was added, varying from 0.2 to 3.0 millimol, most commonly 0.35 millimol. The alkali was NaOH, KOH, ½ $Na_2CO_3$, $NH_3$, or monoethanolamine, and the pH was increased to the desired value within the range from 8 to 10.5.

After pH adjustment, the $H_2S$-containing gas stream was introduced and the $H_2S$ removal reaction carried out until the pH had dropped to the original pH 7.1, after which additional alkali was added to maintain the pH within the stated range. The sulfur formed was filtered off, washed and dried, and amounted to 80–95% of theoretical. Since losses due to adherence to walls, etc. were unavoidable, the amount of sulfur formed was calculated from the $H_2S$ introduced, and the $SO_x$ formation was calculated based on the amount of acidity formed:

1 $H_2S$ = 1 $SO_x$;
1 $SO_x$ = 2 NaOH.

The acidity formed is equal to the amount of alkali consumed during an operation conducted to have the same pH at the end as at the start.

TABLE I

EFFECTIVENESS IN REMOVAL OF $H_2S$; FORMATION OF SOLUBLE $SO_x$ COMPOUNDS INHIBITION OF $SO_x$ FORMATION BY ADDITION OF Na-FORMATE

| Example No. | Chelating Agent | pH Range | Na Formate Added | ppm $H_2S$ in Air Stream Input | ppm $H_2S$ in Air Stream Output | % $H_2S$ Removal | $SO_x$ Formed % of Total S in moles | Ratio $SO_x$ With/Without Na Formate |
|---|---|---|---|---|---|---|---|---|
| 1 | HEDTA-Fe | 9.3–7.1 | Yes | 13,000 | Nil | 100 | 0.5 | 0.5/2.3 = 22% |
| Control A | (Example B) | 9.0–7.1 | — | 10,000 | Nil | 100 | 2.3 | |
| Control B | (Example B) | 7.0–5.5 | — | 10,000[1] | 100–800 | 99–92 | 0.7 | |
| 2 | (Example B) | 7.0–5.4 | Yes | 10,000 | 100–500 | 94–95 | 0.4 | 0.4/0.7 = 57% |
| 3 | EDTA-Fe | 8.0–7.0 | Yes | 10,000 | Nil-20 | 100–99.8 | 0.6 | |
| Control C | (Example C) | 8.2–7.0 | — | 5,000 | 50–200 | 99–96 | 5.5 | |
| Control D | (Example C) | 8.0–6.6 | — | 5,000 | 50–400 | 99–92 | | 0.6/5.5 = 11% |
| 4 | NTA-Fe | 8.0–7.0[2] | Yes | 5,000 | 5–20 | 99.9–99.6 | 1.7 | |
| Control E | (Example D) | 8.4–7.0[2] | — | 10,000 | 1000 | 90 | 8.3 | |
| Control F | (Example D) | 8.4–7.0[2] | — | 5,000 | 10–800 | 99.8–94 | | 1.7/8.3 = 20% |
| 5 | (Example D) | 6.5–6.2[3] | Yes | 5,000 | 10–50 | 99.8–99 | 1.3 | |
| 6 | (Example D) | 6.5–6.2[3] | Yes | 10,000 | 40–120 | 99.6–98.8 | | = 14%/9.0 |
| Control G | (Example D) | 6.5–5.8[3] | — | 5,000 | 1200 | 76 | 9.0 | |
| 7 | N,N-dihydroxyethyl glycine-Fe | 8.4–7.5 | Yes | 5,000 | Nil-10 | 100–99.8 | 0.5 | |
| Control J | (Example E) | 8.3–7.1 | — | 5,000 | 5–20 | 99.9–99.6 | 1.8 | 0.5/1.8 = 28% |
| 8 | Diethylene triamine tetraacetic acid-Fe | 8.2–7.5 | Yes | 5,000 | Nil | 100 | | |
| 9 | (Example F) | 8.2–7.5 | Yes | 10,000 | 100–800 | 99–92 | 1.3 | |
| Control K | (Example F) | 8.2–7.5 | — | 5,000 | 20–50 | 99.6–99 | 1.8 | 1.3/1.8 = 72% |
| 10 | 2-Hydroxy ethylimino diacetic acid - Fe | 8.0–7.1 | Yes | 10,000 | 10–60 | 99.8–98.8 | 4.4 | |
| Control L | (Example G) | 8.2–7.1 | — | 5,000 | 150–200 | 97–96% | 8.5% | 4.4/8.5 = 51% |
| 11 | Mixed alkyldiamine-polyacetic acids-Fe | 9.0–7.2 | Yes | 10,000 | Nil- 5 | 100–99.95 | 2.3 | |
| Control M | | 9.3–7.2 | — | 10,000 | 40–250 | 99.6–97.5 | 5.3 | 2.3/5.3 = 43% |
| 12 | 1,2-Diamino cyclohexane tetraacetic acid-Fe | 9.5–7.2 | Yes | 5,000 | 10–20 | 99.8–99.6 | 4.0 | |
| Control N | (Example H) | 10.0–7.2 | – | 5,000 | 150 | 97 | 5.8 | 4.0/5.8 = 69% |
| Control Z | None | 5.0–4.5 | – | 5,000 | 1500–4600 | 70–8 | Turns black. Only trace soluble Fe left | |

[1]output 2,000 ppm at 13,000 ppm input
[2]NaOH for pH control
[3]Soda ash for pH control as per U.S. 3,622,273

It is apparent from the data that use of the inhibitor at pH 3 to 11 gives optimum $H_2S$ removal and a minimum of $SO_x$ formed.

Examples 1 to 12 show that in the presence of sodium formate, the removal of $H_2S$ is always above 99% and sometimes quantitative and the formation of $SO_x$ compounds is a fraction of that obtained without the inhibitor.

Example 3 shows clearly both the inhibition of $SO_x$ and improved efficiency on the alkaline side. Example 4 vs. Control F shows on alkaline side reduction of $SO_x$ from 8.3 to 1.7% and reduction of $H_2S$ output from 10–800 to 5–20 ppm. On the acid side, Example 5 and Control G show reduction of $SO_x$ from 9% to 1.3% and reduction of $H_2S$ output from 1200 to 10–50 ppm, and Example 6 shows that even at 10,000 ppm $H_2S$ input the output is only 40–120 ppm against 1000 ppm in Control E.

Similarly improved results are shown by Example 7 vs. Control J, Examples 8 and 9 vs. Control K, Example 10 vs. Control L, Examples 11 vs. Control M, and Example 12 vs. Control N.

Control Z shows the effect of no chelate.

Controls A, C, E, J, K, M amd N show relatively good hydrogen sulfide removal at an alkaline pH, but high $SO_x$ formation. The hydrogen sulfide removal is clearly inferior to the results in presence of the inhibitor.

Controls B, D, G and L show relatively poor $H_2S$ removal at an acid pH. However, $SO_x$ formation is lower than on the alkaline side.

EXAMPLES 13 TO 31

The experimental conditions of Examples 1 to 12 were used in a further set of runs, with the Fe-chelate solution of Example B and a number of inhibitors. Each test utilized 20 ml of the Fe-chelate solution diluted to 50 ml. The results are shown in Table II.

TABLE II

| Example No. | pH Range | Alkali Added Millimols | Salt Added Salt Name | pH of N/10 Sol. | Amount as Fe Equiv. | Conc. $H_2S$ in Stream In-ppm | Conc. $H_2S$ in Stream Out-ppm | $H_2S$ Removal in % | $SO_x$ as % of Total S in Mols |
|---|---|---|---|---|---|---|---|---|---|
| Control O | 9.0–7.1 | 0.35 NaOH | None | — | — | 10,000 | Nil | 100 | 2.3% |
| Control P | 7.0–5.5 | 0.15 NaOH | None | — | — | 10,000 | 100–800 | 99–92 | 0.7% |
| Control Q | 4.6–5.6 | — | None | — | — | 14,000 | 700–1600 | 95–89 | 0.75% |
| 13 | 9.4–7.1 | 0.35 NaOH | Na-Formate | 6.4 | 14 | 10,000¹ | Nil | 100 | 0.3% |
| 14 | 9.3–7.1 | 0.35 NaOH | Na-Formate | 6.4 | 7 | 10,000¹ | Nil | 100 | 0.5% |
| 15 | 8.6–7.1 | 0.30 MEA | Na-Formate | 6.4 | 2 | 10,000 | Nil | 100 | 0.5% |
| 16 | 8.1–7.1 | 0.17 $Na_2CO_3$ | Na-Formate | 6.4 | 2 | 10,000 | Nil | 100 | 0.7% |
| 17 | 9.0–7.1 | 0.35 NaOH | Na-Citrate | 7.1 | 7 | 10,000 | Nil | 100 | 0.45% |
| 18 | 9.3–7.1 | 0.35 NaOH | Na-Propionate | 7.2 | 7 | 10,000¹ | Nil | 100 | 0.6% |
| 19 | 8.0–7.1 | 0.5 NaOH | $NH_4$-Propionate | 7.1 | 7 | 10,000 | Nil | 100 | 0.85% |
| 20 | 9.2–7.1 | 0.2 NaOH | Na-Malate | 7.1 | 7 | 10,000 | Nil | 100 | 0.6% |
| 21 | 9.4–7.1 | 0.35 NaOH | Na-Oxalate | 6.5 | 7 | 10,000 | Nil | 100 | 1.0% |
| 22 | 9.0–7.1 | 0.50 NaOH | KNa-Phthalate | 7.1 | 7 | 10,000 | Nil | 100 | 1.1% |
| 23 | 8.8–7.1 | 0.35 NaOH | Na-Acetate | 7.8 | 7 | 10,000 | Nil | 100 | 1.1% |
| 24 | 6.2–6.6 | 0.2 NaOH | Na-Acetate | 7.8 | 12 | 14,000 | 70 | 99.5 | 0.4% |
| 25 | 8.8–7.1 | 0.35 NaOH | K Na-Tartrate | 6.8 | 7 | 10,000 | Nil | 100 | 1.3% |
| 26 | 9.0–7.1 | 0.35 NaOH | Na-Salicylate | 5.8 | 7 | 10,000 | Nil | 100 | 1.3% |
| 27 | 9.0–7.1 | 0.35 NaOH | Na-Lactate | 7.2 | 7 | 10,000 | Nil | 100 | 1.4% |
| 28 | 9.4–7.1 | 0.35 NaOH | Na-Benzoate | 6.6 | 7 | 10,000 | Nil | 100 | 1.7% |
| 29 | 9.3–7.0 | 0.33 NaOH | Na-Nitrite | 6.1 | 7 | 10,000 | Nil | 100 | 1.5% |
| 30 | 6.7–6.4 | 0.50 NaOH | Na-Thiosulfate | 5.5 | 7 | 14,000 | Nil | 100 | 0.35% |
| 31 | 9.4–7.1 | 0.35 NaOH | Na-Formate | 6.4 | 14 | 13,000* | Nil* | 100* | |

*Ethyl mercaptan instead of $H_2S$.
¹Nil at 13,000 ppm

The data shows that at an alkaline pH without an inhibitor (Control O) the $H_2S$ removal is good, but $SO_x$ formation is high, and at an acid pH, without inhibitor (Control P), $SO_x$ formation is low, but $H_2S$ removal is poor.

Examples 13 to 31 on the other hand give quantitative $H_2S$ removal at 10,000 ppm $H_2S$ and even as high as 13,000 ppm $H_2S$. Example 31 shows that it is possible to obtain quantitative alkyl mercaptan removal using 13,000 ppm ethyl mercaptan in place of 10,000 ppm $H_2S$.

EXAMPLE 32

100 parts of HEDTA-Fe chelate solution containing 0.4% Fe in the ferric form was placed in the sparger type reactor described earlier. The pH was adjusted to 8.0 with dilute alkali and air was completely removed from the system by running a stream of nitrogen through the apparatus for 30 minutes. The nitrogen stream was replaced by a stream containing 3.2% hydrogen sulfide in 96.8% nitrogen. The speed of addition of hydrogen sulfide was such that one equivalent hydrogen sulfide with respect to ferric ion was introduced during 25 minutes for one oxidation-reduction cycle. During 24 minutes the output stream contained no hydrogen sulfide, but the color of the solution changed gradually from deep orange brown (ferric ion) to pale green (ferrous ion) together with formation of suspended sulfur. At 25 minutes the output gas stream contained 10 ppm hydrogen sulfide and at 26 minutes this increased to 900 ppm. The decolorized, exhausted catalyst solution was subsequently treated with a measured slow air stream. The color of the solution gradually returned to the deep orange brown of ferric ion and after 6 minutes the catalyst was in the oxidized state. Oxygen introduced was about two times theoretical. After removal of oxygen from the system with a stream of nitrogen, the addition of hydrogen sulfide was repeated and a second oxidation-reduction cycle was complete after 26 minutes, the output gas increasing at once from a trace to 1,200 ppm hydrogen sulfide. The separate oxidation-reduction cycle may be carried out simultaneously by the use of two reactors for the oxidation of hydrogen sulfide and the reoxidation of spent catalyst, respectively.

Having regard to the foregoing disclosure, the following is claimed as the inventive and patentable embodiments thereof;

1. A cyclic process for the removal of hydrogen sulfide and alkyl mercaptans contained in gaseous streams, and the substantially quantitative catalytic conversion thereof to elemental sulfur and dialkyl disulfides, respectively, while inhibiting the formation of acidic sulfur oxides, which comprises contacting the gaseous stream with an aqueous solution consisting essentially of a water-soluble polyvalent metal chelate catalyst retaining the metal in soluble form in the aqueous solution and having a pH within the range from about 3 to about 11, the chelate catalyst comprising a chelating amino acid selected from the group consisting of:

$$(A)_{3-n} - N - (X)_n,  \qquad I$$

wherein $n$ is a number from 1 to 3;

X is selected from the class consisting of acetic and propionic acid groups;

A is 2-hydroxy ethyl, 2-hydroxy propyl, or an alkyl group having from one to about four carbon atoms.

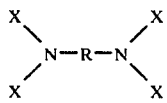   II.

wherein
from two to four of the groups X are selected from the class consisting of acetic and propionic acid groups;
from zero to two of the groups X are selected from the class consisting of 2-hydroxy ethyl, 2-hydroxy propyl, and

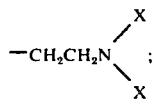

R is ethylene, propylene or isopropylene or alternatively cyclohexane or benzene where the two hydrogen atoms replaced by nitrogen are in the 1,2-position;
and an alkali metal, alkaline earth metal, ammonium or amine salt of an acid other than the chelating amino acid having a pK within the range from about 1.2 to about 6 in an amount within the range from 1 to 14 equivalents calculated as Fe equivalents; contacting aqueous polyvalent metal chelate catalyst solution with free oxygen gas to regenerate the catalyst for contact with another portion of the gaseous stream; and separating the sulfur and any dialkyl disulfides from the aqueous metal chelate solution.

2. A process in accordance with claim 1, in which the polyvalent metal amino acid chelate catalyst is formed from a chelating amino acid having the formula:

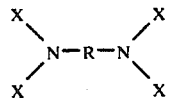   II.

wherein
from two to four of the groups X are selected from the class consisting of acetic and propionic acid groups;
from zero to two of the groups X are selected from the class consisting of 2-hydroxy ethyl, 2-hydroxy propyl, and

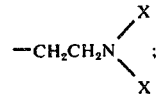

R is ethylene, propylene or isopropylene or alternatively cyclohexane or benzene where the two hydrogen atoms replaced by nitrogen are in the 1,2-position.

3. A process in accordance with claim 1, in which the polyvalent metal amino acid chelate catalyst is formed from a chelating amino acid having the formula:

   I wherein
n is a number from 1 to 3;
X is selected from the class consisting of acetic and propionic acid groups;
A is 2-hydroxy ethyl, 2-hydroxy propyl, or an alkyl group having from one to about four carbon atoms.

4. A process in accordance with claim 1, in which the amino acid is selected from the group consisting of 2-hydroxyethyl imino diacetic acid, nitrilo triacetic acid, N,N-dihydroxyethyl glycine, ethylene diamine tetraacetic acid, N-hydroxyethyl ethylene diamine triacetic acid, diethylene triamine pentaacetic acid, and trans-1,2-diaminocyclohexane tetraacetic acid.

5. A process in accordance with claim 1, in which the amino acid is N-hydroxyethyl ethylene diamine triacetic acid.

6. A process in accordance with claim 1, in which the free oxygen gas is added to the gaseous stream and reduced catalyst oxidized in situ thereby.

7. A process in accordance with claim 1, in which the free oxygen gas is added to the aqueous chelate solution, and reduced catalyst oxidized in situ thereby.

8. A process in accordance with claim 1, in which the free oxygen gas is added to the gaseous stream and reduced catalyst oxidized in situ thereby from time to time.

9. A process in accordance with claim 1, in which the free oxygen gas is added in a second stage to the aqueous chelate solution, and the reduced catalyst oxidized thereby is then recycled to contact another portion of the gaseous stream.

10. A process in accordance with claim 1, in which the polyvalent metal is selected from the group consisting of iron, cobalt and nickel.

11. A process in accordance with claim 10, in which the polyvalent metal is iron.

12. A process in accordance with claim 1, in which the acid having a pK from 1.2 to 6 is selected from the group consisting of formic acid, citric acid, propionic acid, malic acid, oxalic acid, phthalic acid, acetic acid, tartaric acid, salicylic acid, lactic acid, benzoic acid, thiosulfuric acid, and nitrous acid.

13. A process in accordance with claim 12, in which the salt of the acid is an alkali metal salt.

14. A process in accordance with claim 12, in which the salt of the acid is an ammonium salt.

15. A process in accordance with claim 12, in which the salt of the acid is an amine salt.

16. A process in accordance with claim 12, in which the salt of the acid is an alkaline earth metal salt.

17. A process in accordance with claim 12, in which the salt of the acid is a sodium salt.

18. A process in accordance with claim 1, in which the pH of the aqueous chelate solution is within the range from about 7 to about 11.

19. A process in accordance with claim 1, in which the pH of the aqueous chelate solution is within the range from about 8 to about 10.

* * * * *

UNITED STATES PATENT OFFICE
CERTIFICATE OF CORRECTION

Patent No. 4,009,251      Dated February 22, 1977

Inventor(s) Walter C. Meuly      Page 1 of 2

It is certified that error appears in the above-identified patent and that said Letters Patent are hereby corrected as shown below:

| | | |
|---|---|---|
| Column 6, line 47 | : | "teritary" should be -- tertiary -- |
| Column 7, lines 33, 34 | : | Omit: "and should then be oxidizable by oxygen from the lower valence state" |
| Column 9, line 56 | : | "trans-1.2-" should be -- trans-1,2- -- |
| Column 11, Table I under column heading: Ratio $SO_x$ With/Without Na Formate: | | Example 6: "$=\frac{14\%}{9.0}$" should be -- $\frac{1.3}{9.0} = 14\%$ -- |
| Under column heading: % $H_2S$ Removal | : | Example 11: "100-99.- 95" should be -- 100-99.95 -- |

UNITED STATES PATENT OFFICE
CERTIFICATE OF CORRECTION

Patent No. 4,009,251  Dated February 22, 1977

Inventor(s) Walter C. Meuly  Page 2 of 2

It is certified that error appears in the above-identified patent and that said Letters Patent are hereby corrected as shown below:

Column 13, Table II  :  should be

TABLE II

| | Experimental Conditions | | | | | Conc. $H_2S$ in Stream In-ppm | Conc. $H_2S$ in Stream Out-ppm | $H_2S$ Removal in % | $SO_x$ as % of Total S in Mols |
|---|---|---|---|---|---|---|---|---|---|
| Example No. | pH Range | Alkali Added Millimols | Salt Added Salt Name | pH of N/10 Sol. | Amount as Fe Equiv. | | | | |
| Control O | 9.0-7.1 | 0.35 NaOH | None | — | — | 10,000 | Nil | 100 | 2.3% |
| Control P | 7.0-5.5 | 0.15 NaOH | None | — | — | 10,000 | 100-800 | 99-92 | 0.7% |
| Control Q | 4.6-5.6 | — | None | — | — | 14,000 | 700-1600 | 95-89 | 0.75% |
| 13 | 9.4-7.1 | 0.35 NaOH | Na-Formate | 6.4 | 14 | 10,000¹ | Nil | 100 | 0.3% |
| 14 | 9.3-7.1 | 0.35 NaOH | Na-Formate | 6.4 | 7 | 10,000¹ | Nil | 100 | 0.5% |
| 15 | 8.6-7.1 | 0.30 MEA | Na-Formate | 6.4 | 2 | 10,000 | Nil | 100 | 0.5% |
| 16 | 8.1-7.1 | 0.17 $Na_2CO_3$ | Na-Formate | 6.4 | 2 | 10,000 | Nil | 100 | 0.7% |
| 17 | 9.0-7.1 | 0.35 NaOH | Na-Citrate | 7.1 | 7 | 10,000 | Nil | 100 | 0.45% |
| 18 | 9.3-7.1 | 0.35 NaOH | Na-Propionate | 7.2 | 7 | 10,000¹ | Nil | 100 | 0.6% |
| 19 | 8.0-7.1 | 0.5 NaOH | $NH_4$-Propionate | 7.1 | 7 | 10,000 | Nil | 100 | 0.85% |
| 20 | 9.2-7.1 | 0.2 NaOH | Na-Malate | 7.1 | 7 | 10,000 | Nil | 100 | 0.6% |
| 21 | 9.4-7.1 | 0.35 NaOH | Na-Oxalate | 6.5 | 7 | 10,000 | Nil | 100 | 1.0% |
| 22 | 9.0-7.1 | 0.50 NaOH | KNa-Phthalate | 7.1 | 7 | 10,000 | Nil | 100 | 1.1% |
| 23 | 8.8-7.1 | 0.35 NaOH | Na-Acetate | 7.8 | 7 | 10,000 | Nil | 100 | 1.1% |
| 24 | 6.2-6.6 | 0.2 NaOH | Na-Acetate | 7.8 | 12 | 14,000 | 70 | 99.5 | 0.4% |
| 25 | 8.8-7.1 | 0.35 NaOH | K Na-Tartrate | 6.8 | 7 | 10,000 | Nil | 100 | 1.3% |
| 26 | 9.0-7.1 | 0.35 NaOH | Na-Salicylate | 5.8 | 7 | 10,000 | Nil | 100 | 1.3% |
| 27 | 9.0-7.1 | 0.35 NaOH | Na-Lactate | 7.2 | 7 | 10,000 | Nil | 100 | 1.4% |
| 28 | 9.4-7.1 | 0.35 NaOH | Na-Benzoate | 6.6 | 7 | 10,000 | Nil | 100 | 1.7% |
| 29 | 9.3-7.0 | 0.33 NaOH | Na-Nitrite | 6.1 | 7 | 10,000 | Nil | 100 | 1.5% |
| 30 | 6.7-6.4 | 0.50 NaOH | Na-Thiosulfate | 5.5 | 7 | 14,000 | Nil | 100 | 0.35% |
| 31 | 9.4-7.1 | 0.35 NaOH | Na-Formate | 6.4 | 14 | 13,000* | Nil* | 100* | |

Signed and Sealed this

Thirty-first Day of May 1977

[SEAL]

Attest:

RUTH C. MASON  
Attesting Officer

C. MARSHALL DANN  
Commissioner of Patents and Trademarks